United States Patent [19]

Zivi et al.

[11] Patent Number: 5,727,914

[45] Date of Patent: Mar. 17, 1998

[54] APPARATUS FOR SHAVING THE OUTSIDE DIAMETER OF A FIBER OPTIC MICROCABLE

[75] Inventors: Daniel F. Zivi, Severna Park; Lawrence D. Piggot, Greensboro, both of Md.

[73] Assignee: Northrop Grumman Corporation, Los Angeles, Calif.

[21] Appl. No.: 600,776

[22] Filed: Feb. 13, 1996

[51] Int. Cl.[6] .................................................. B23D 1/20
[52] U.S. Cl. ......................................................... 409/298
[58] Field of Search ................................... 409/289, 297, 409/298, 300; 29/33 F; 30/90.1, 90.4

[56] References Cited

U.S. PATENT DOCUMENTS

| | | | |
|---|---|---|---|
| 1,439,370 | 12/1922 | Lambert | 409/298 X |
| 2,638,818 | 5/1953 | Stevens | 409/298 |
| 4,324,515 | 4/1982 | Ehling | 409/300 |
| 4,611,748 | 9/1986 | Winter et al. | 409/298 X |
| 4,650,380 | 3/1987 | Lipowski | 409/289 X |
| 5,140,751 | 8/1992 | Faust | 30/90.4 X |

*Primary Examiner*—William Briggs
*Attorney, Agent, or Firm*—Walter G. Sutcliff

[57] ABSTRACT

Apparatus for removing surface irregularities, e.g. high spots, from the outside jacket or covering of a fiber optic cable. The apparatus includes sets of alternately spaced relatively thin blades, e.g. razor blades, accurately positioned on respective movable opposing slide assemblies with the mutually facing edges of the blades including a small groove or notch machined therein so as to form a round bore having a diameter equal to or slightly greater than the outside diameter of the cable's jacket when two sets of blades on the opposing slide assemblies are brought together in meshing relationship whereupon the surface irregularities on the jacket are removed by scraping or shaving of the cable's jacket when the fiber optic cable is pulled through or otherwise passes through the bore formed between the blades.

17 Claims, 3 Drawing Sheets

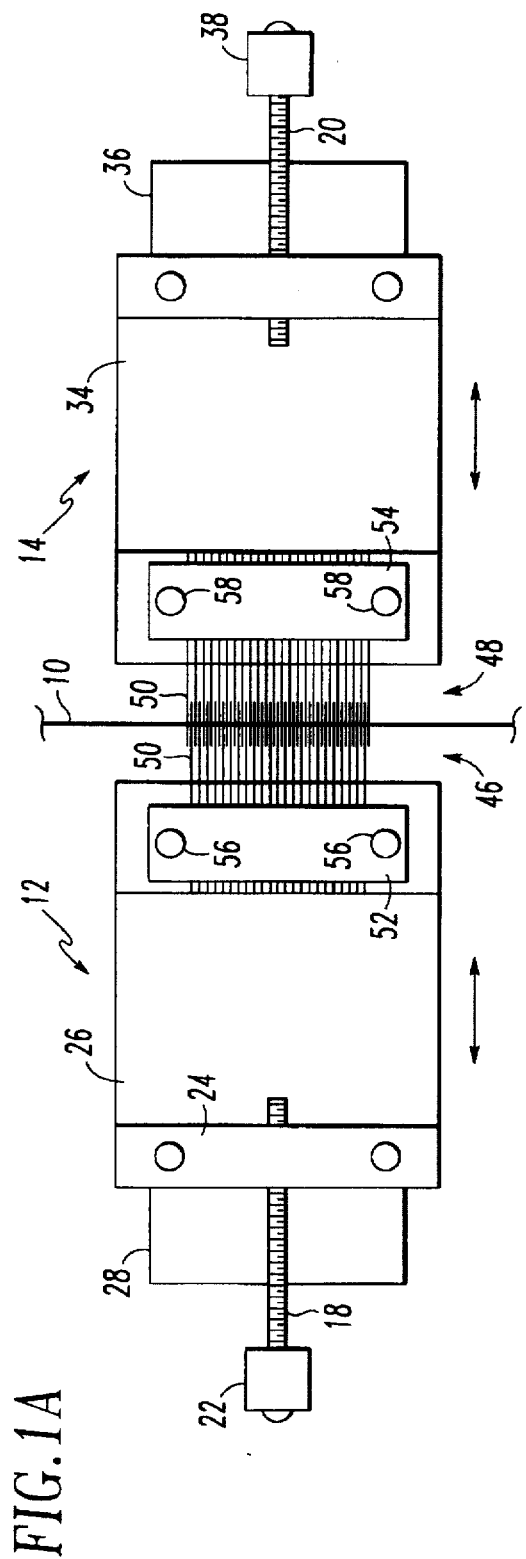
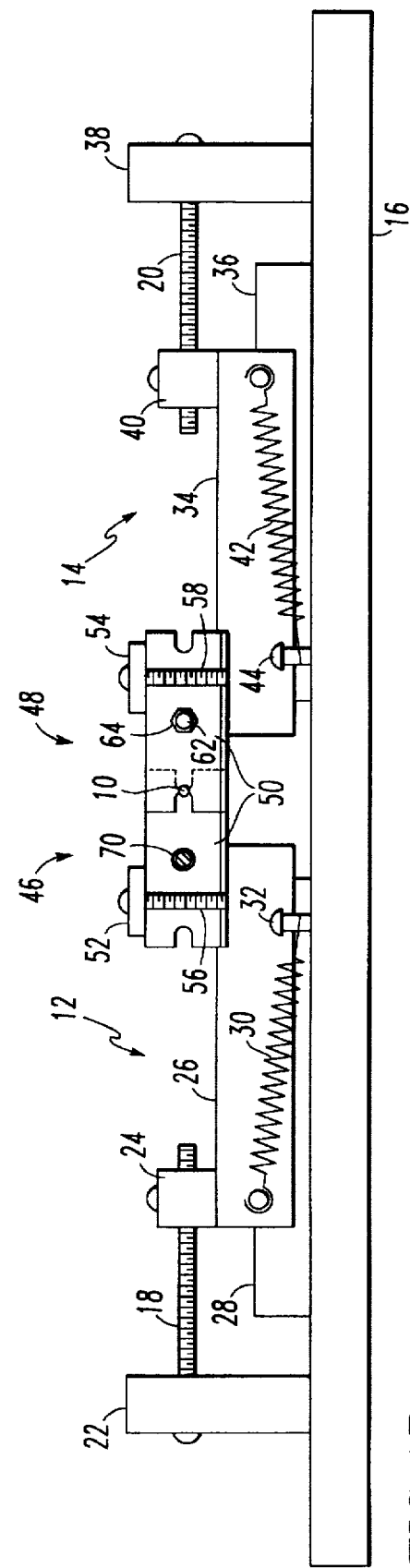
FIG.1A
FIG.1B

APPARATUS FOR SHAVING THE OUTSIDE DIAMETER OF A FIBER OPTIC MICROCABLE

BACKGROUND OF THE INVENTION

1. Field of the Invention

This invention relates generally to apparatus for removing surface irregularities from electrical wires and cables and more particularly to apparatus for removing surface irregularities such as high spots from the outside jacket of a fiber optic cable.

2. Description of the Prior Art

Apparatus for stripping insulation from electrical wires and cables is generally known. Typically, such apparatus includes what is commonly referred to in the art as "wire strippers". Wire strippers come in many forms and can range from a simple manually gripped device to relatively sophisticated devices which include cutter heads having micrometer type adjustment means which are used to set or position dye-type blades. One example of this type of device is a wire stripper which includes a set of dies which are used, for example, to strip the insulation from coaxial cables and the like. An inherent limitation of this type of a device is that the dies used cannot be readily readjusted to compensate for wear.

The problem associated with the development of this invention was the emergence of a precision spool winding process for coiling fiber optic microcable. The application of a binder in the form of a low strength adhesive material during winding allows the spool to be a free standing spool pack after it is removed from a winding mandrel. This winding process, however, is very sensitive to diameter control and circularity of the outside surface of the fiber optic microcable and irregularities or anomalies in the outer diameter of the cable can prevent precision winding which is essential to ensure reliable payout of the spool pack.

It became apparent that in many instances lengths of fiber optic microcable when purchased from a vendor, were not winding properly due to surface imperfections. In order to remove these surface imperfections which typically comprise high spots on the outer surface of the covering or jacket of the fiber optic cable, the high spots had to be trimmed off with a scalpel or razor blade by hand.

SUMMARY

Accordingly, it is an object of the present invention to provide an improvement in apparatus for stripping electrical wires and cables.

It is another object of the present invention to provide apparatus for removing surface irregularities from the outer surface of wires and cables.

It is yet another object of the invention to provide apparatus for improving the circularity of the outside diameter of a fiber optic cable.

It is yet a further object of the invention to provide apparatus for removing the high spots from the jacket or outer covering of a fiber optic microcable.

It is still yet another object of the invention to provide apparatus for shaving the outer surface of a fiber optic microcable while permitting continued readjustment of the parts for wear, thereby obviating the need for part replacement when wear does occur.

Briefly, the foregoing objects are achieved by apparatus for removing surface irregularities such as high spots from the outside jacket or covering of a fiber optic cable by means of opposing sets of alternately spaced relatively thin blades, such as razor blades, accurately positioned on respective movable slides, with the mutually facing edges of the blades including a small groove or notch fabricated therein so as to form a round bore therethrough having an outside diameter equal to or slightly greater than that of the jacket covering the fiber optic cable when two sets of blades on opposing slides are moved together in meshing relationship, whereupon the surface irregularities on the jacket are removed by shaving or scraping when the fiber optic cable is pulled through the bore formed between the blades.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1A is a top plan elevational view generally illustrative of the preferred embodiment of the invention;

FIG. 1B is a front elevational view of the preferred embodiment of the invention shown in FIG. 1A;

DETAILED DESCRIPTION OF THE INVENTION

Figure 2:
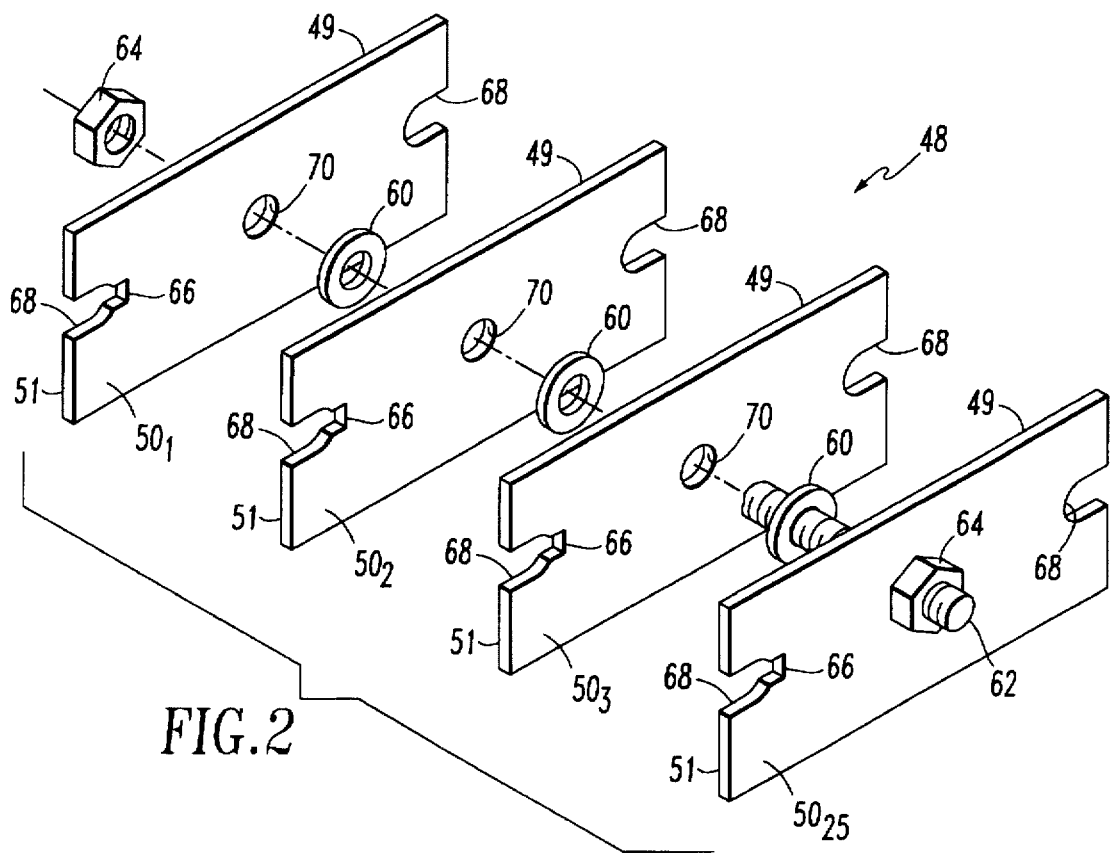
FIG. 2 is an exploded perspective view generally illustrative of a set of relatively thin blades such as razor blades used in the embodiment of the invention shown in FIGS. 1A and 1B.

The present invention is particularly adapted for use in connection with a fiber optic microcable shown by reference numeral 10, for example, in FIG. 1A. Fiber optic microcables are typically constructed of continuous, longitudinal filaments of E-glass held tightly around a 0.010 in. diameter buffered optic fiber. The E-glass is held together in a matrix of epoxy resin. To improve the circularity or roundness of the cable 10 and to reduce friction, a thin layer of ultra-violet(UV) curved acrylate material is flowed over the E-glass/epoxy matrix resulting in a nominal outside diameter of 0.0315 in. being provided. In the coating process, irregularities or anomalies in the form of high spots occur in this outer acrylic layer, although some loose pieces of E-glass can also become encased in the acrylic, causing a bump.

In order to wind this type of fiber optic cable in the precision spool winding process outlined above, such irregularities required removal. It was observed that where the irregularities were removed by manually shaving the outer surface material of the fiber optic cable, the anomalies could be removed with multiple gentle passes with a sharp metal blade or sharp metal edge. Where there was a requirement for not shaving good cable but only shaving the high spots, the apparatus according to the present invention was developed which could simulate this hand shaving process without causing damage to the cable which would not jam or break if an exceptionally large anomaly was encountered.

Referring now to FIGS. 1A and 1B, the apparatus for achieving the desired results of removing irregularities from the jacket of fiber optic microcable 10 includes at least one pair of identical precision slide assemblies 12 and 14 which are mounted in opposition on a base plate 16 and which are movable back and forth relative to each other by adjustment screws 18 and 20. Adjustment screw 18 has one end engaging a vertically oriented support block or post member 22, while its other end engages a generally horizontal block member 24 which is mounted on the top surface of a movable upper slide member 26 which is supported by a fixed lower slide member 28. A tension bias spring 30 is secured at one side of the upper slide member 26 to a pin 32 inserted in the base plate 16. The spring 30 acts on the upper slide member 26 urging it toward the fiber optic cable 10.

In a like manner, the opposing slide assembly 14 includes an upper slide member 34 which is movably mounted on a lower slide member 36. The movement of the upper slide member 34 is controlled by the adjustment of the screw member 20 which is held by a vertical post member 38 mounted on the base plate 16 and the horizontal block member 40 located on the top of the upper slide member 34. As in the slide assembly 12, a tension spring 42 connects the side of the upper slide member 34 to a pin 44 for biasing the movable plate in a forward direction toward the fiber optic cable 10.

On the forward top portion of the upper slide members 26 and 34 of the slide assemblies 12 and 14 are mounted opposing sets 46 and 48 of alternately spaced relatively thin blades 50, such as double edged razor blades having a pair of relatively longer cutting edges 49 and a pair of relatively shorter side edges 51 and which are laid along their elongated cutting edges 49 and bolted together as shown in FIG. 2, and retained in place by means of respective top plates 52 and 54 which are secured to the upper slide members 26 and 34 by pairs of bolts 56 and 58 which engage the top portions of the slide members 26 and 34.

Considering now the two sets 46 and 48 of blades 50 which mesh together as shown in FIG. 1A. Both sets are of identical construction. FIG. 2 is illustrative of the right hand set 48 and is comprised of twenty-five double edged razor blades $50_1, 50_2 \ldots 50_{25}$ which are equally spaced apart by precision thrust washers 60 and are held together by means of a long bolt 62 and a pair of end nuts 64.

Figure 3:
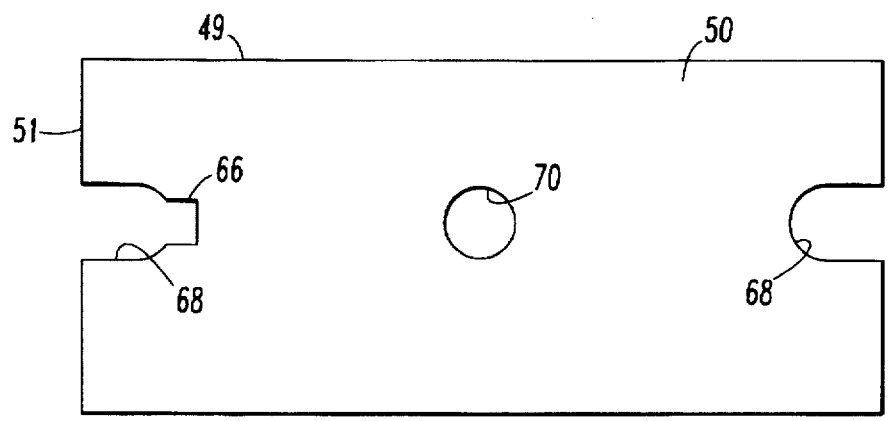
FIG. 3 is a top plan view of one of the blades shown in FIG. 2.

Further as shown in FIG. 3, each razor blade element 50 includes a relatively small round groove 66 machined in one of the side slots 68 which are formed in the side edges 51 during the blade's manufacture along with a center hole 70. The groove 66 is semicircular and is cut to a dimension slightly more than one half the diameter of the fiber optic microcable 10, which for a 0.0315 in. diameter fiber optic cable, would be approximately 0.020 in. deep. While one groove 66 is shown machined in the slot 68, an identical groove, not shown, could also be formed in its opposing slot 68 on the other side of the center hole.

Razor blades were selected for use due their high strength, flexibility, good wear resistance and low cost. The grooves 66 formed in each of the razor blades 50 were machined simultaneously by bolting, for example, 25 razor blades $50_1 \ldots 50_{25}$ together, thus ensuring a set of razor blades having the same sized groove 66.

Thus when the two slide assemblies 12 and 14, as shown in FIGS. 1A and 1B, are moved together the grooves 66 in the respective razor blade assemblies 46 and 48 form a round aperture and bore therethrough approximately equal to or slightly greater than the diameter of the fiber optic cable 10. A subsequent passage, such as by pulling, of the fiber optic cable 10 therethrough will result in the high spots and surface imperfections being shaved or scraped off, and thereby providing an optic cable having a constant outside diameter.

Figure 4:
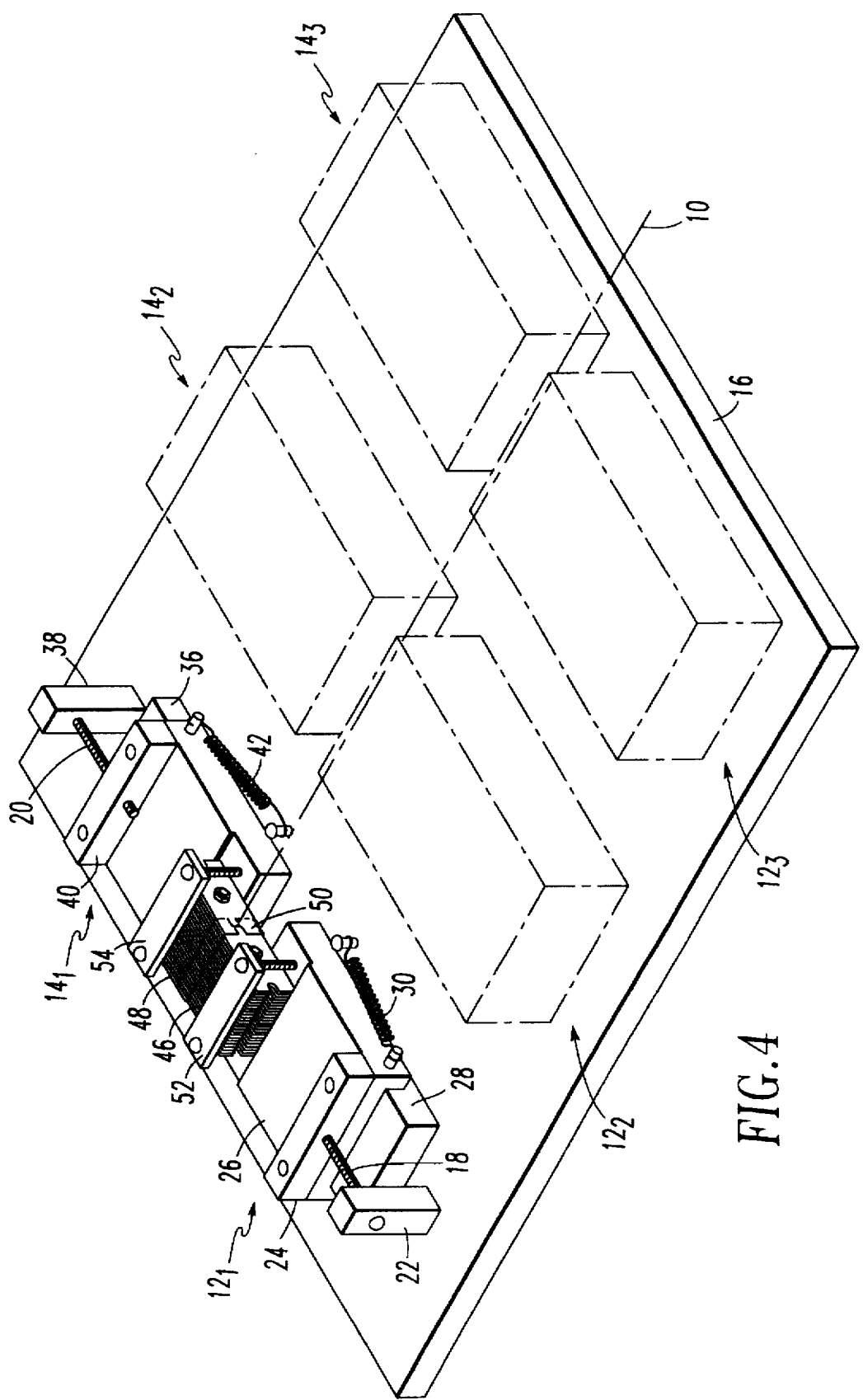
FIG. 4 is a perspective view of an embodiment of the invention including three in-line blade assemblies such as shown in FIGS. 1A and 1B.

Referring now to FIG. 4, shown thereat is a configuration including three separate pairs of shaving apparatus, as shown in FIGS. 1A and 1B, linearly aligned so as to successively receive the same fiber optic cable 10 by the slides $12_1, 12_2, 12_3$ and $14_1, 14_2$ and $14_3$ on either side of the center line of the microcable 10 so that the entire assembly is comprised of 150 blades, 75 per side.

Such an arrangement permits progressively finer adjustments of each blade group and therefore the shaving of an anomaly progressively occurs as the fiber optic cable 10 passes the three sets of blade assemblies. The blades 50 only require adjusting at the beginning of a shaving operation. The adjustment of the blades 50 via the precision slides 12 and 14 permitted a fine adjustment of the bore size, depending on the base diameter of a particular cable. Where the grooves 66 begin to widen following a number of shaving operations, it is only necessary that the blades 50 be adjusted inward by actuation of the adjusting screws 18 and 20.

Thus what has been shown and described is a relatively simple yet effective means for removing anomalies from the outer jacket of a fiber optic microcable without damaging the integrity of the fiber optic cable itself.

The invention thus described, it would be obvious that the same may be varied in many ways. Such variations are not to be regarded as a departure from the spirit and scope of the invention, and also to modifications as would be obvious to one skilled in the art intended to be included within the scope of the accompanying claims.

We claim:

1. Apparatus for removing surface irregularities from the outside covering of an optical fiber cable, comprising:
 a base plate;
 at least one pair of mutually facing linear slide assemblies mounted on said base plate and including means for being independently moved toward and away from each other;
 a first and second plurality of equally and alternately spaced flexible blade members of like construction respectively mounted in alignment side by side on said slide assemblies so as to oppose one another, each of said blade members having an edge facing a corresponding edge of an opposing blade member, said edge including a slot and a semi-circular groove formed in the slot so as to define a bore for the passage of said cable therethrough when pairs of said alternately spaced blade members are meshed together in overlapping relationship by movement of said slide assemblies, whereby surface irregularities are removed from the outside covering of the optical fiber cable due to a scraping and shaving action provided by said grooves in said first and second plurality of flexible blade members.

2. Apparatus according to claim 1 wherein said groove has a dimension approximately equal to or greater than one-half the diameter of said optical fiber cable.

3. Apparatus according to claim 2 wherein said blade members comprise relatively thin blade members having at least one relatively longer edge and at least one relatively shorter edge and wherein said groove is formed in said shorter edge.

4. Apparatus according to claim 1 wherein said blade members comprise relatively thin blades having generally linear edges.

5. Apparatus according to claim 4 wherein said blade members comprise razor blades.

6. Apparatus according to claim 5 wherein said razor blades include a pair of first length edges and a pair of second length edges and wherein said first length edges are longer than said second length edges.

7. Apparatus according to claim 6 wherein said grooves are located along said second length edges.

8. Apparatus according to claim 1 wherein said grooves have a dimension approximately equal to or greater than one-half the diameter of said optical fiber cable.

9. Apparatus according to claim 8 wherein said first and second plurality of blade members include an equal number of blade members.

10. Apparatus according to claim 1 wherein said at least one pair of linear slide assemblies comprises three aligned pairs of linear slide assemblies located on either side of a path line for said fiber optic cable and wherein each of said pairs of slide assemblies include respective said first and said second pluralities of blade members mounted thereon.

11. Apparatus according to claim 1 wherein each set of said blade members includes a plurality of razor blades mutually separated by equal sized spacer members.

12. Apparatus according to claim 11 wherein said spacer members are comprised of thrust washers.

13. Apparatus according to claim 12 wherein said means for positioning said slide assemblies includes a screw driven movable upper slide member supporting a respective plurality of blade members mounted on a lower slide member fixedly attached to said base plate.

14. Apparatus according to claim 13 and additionally including means for biasing said upper slide members of both said slide assemblies toward one another.

15. Apparatus according to claim 14 wherein said means for biasing comprises spring means.

16. Apparatus according to claim 15 wherein said spring means comprises a tension spring connected between the base plate and the upper slide member.

17. Apparatus according to claim 16 wherein said first and second plurality of blade members include at least 25 blade members.

* * * * *